United States Patent
Lee et al.

(10) Patent No.: US 7,200,948 B2
(45) Date of Patent: Apr. 10, 2007

(54) GEOMAGNETIC SENSOR FOR DETECTING AZIMUTH ANGLE AND METHOD THEREOF

(75) Inventors: Woo-jong Lee, Suwon-si (KR); Sang-on Choi, Suwon-si (KR)

(73) Assignee: Samsung Electro-Mechanics Co., Ltd., Gyeonggi-do (KR)

( * ) Notice: Subject to any disclaimer, the term of this patent is extended or adjusted under 35 U.S.C. 154(b) by 0 days.

(21) Appl. No.: 11/296,345

(22) Filed: Dec. 8, 2005

(65) Prior Publication Data
US 2006/0123642 A1    Jun. 15, 2006

(30) Foreign Application Priority Data
Dec. 13, 2004  (KR) .................... 10-2004-0104770

(51) Int. Cl.
G01C 17/38    (2006.01)

(52) U.S. Cl. ...................................... 33/356

(58) Field of Classification Search ............. 33/355 R, 33/355 D, 356
See application file for complete search history.

(56) References Cited

U.S. PATENT DOCUMENTS

| 4,725,957 | A |   | 2/1988  | Alberter et al. |        |
|-----------|---|---|---------|-----------------|--------|
| 4,995,165 | A |   | 2/1991  | Daniels         |        |
| 5,151,862 | A | * | 9/1992  | Nakayama et al. | 33/356 |
| 5,440,484 | A | * | 8/1995  | Kao             | 33/356 |
| 6,957,156 | B2| * | 10/2005 | Jo et al.       | 33/356 |
| 2004/0187328 | A1 | * | 9/2004 | Satoh et al. | 33/356 |
| 2005/0044737 | A1 | * | 3/2005 | Choi et al.  | 33/356 |
| 2005/0138825 | A1 | * | 6/2005 | Manfred      | 33/356 |
| 2005/0150122 | A1 | * | 7/2005 | Cho et al.   | 33/356 |
| 2005/0188556 | A1 | * | 9/2005 | Lee et al.   | 33/356 |

FOREIGN PATENT DOCUMENTS

DE    39 37 1600 A1    5/1991
EP    1 553 384 A2     7/2005

* cited by examiner

*Primary Examiner*—G. Bradley Bennett
(74) *Attorney, Agent, or Firm*—Sughrue Mion, PLLC

(57) ABSTRACT

A geomagnetic sensor and method are provided. The geomagnetic sensor has a geomagnetic detection module for outputting an electric signal value corresponding to a geomagnetism, a tilt detection module for detecting a tilt angle with reference to a reference plane, a memory for storing a constant for each azimuth angle, and a central processing unit for performing a first azimuth computation using an initial value of the constants, the electric signal value and the tilt angle, and for performing a second azimuth computation by detecting from the memory a constant corresponding to the resultant azimuth of the first azimuth computation and using the detected constant. The method includes outputting an electric signal corresponding to a geomagnetism; normalizing the output electric signal; detecting a tilt angle with respect to a reference plane; performing a first azimuth computation; detecting a constant corresponding to the resultant azimuth; and performing a second azimuth computation.

20 Claims, 5 Drawing Sheets

FIG. 5

| AZIMUTH ANGLE | β |
|---|---|
| 0° | β0 |
| 1° | β1 |
| 2° | β2 |
| . | . |
| . | . |
| . | . |
| 360° | β360 |

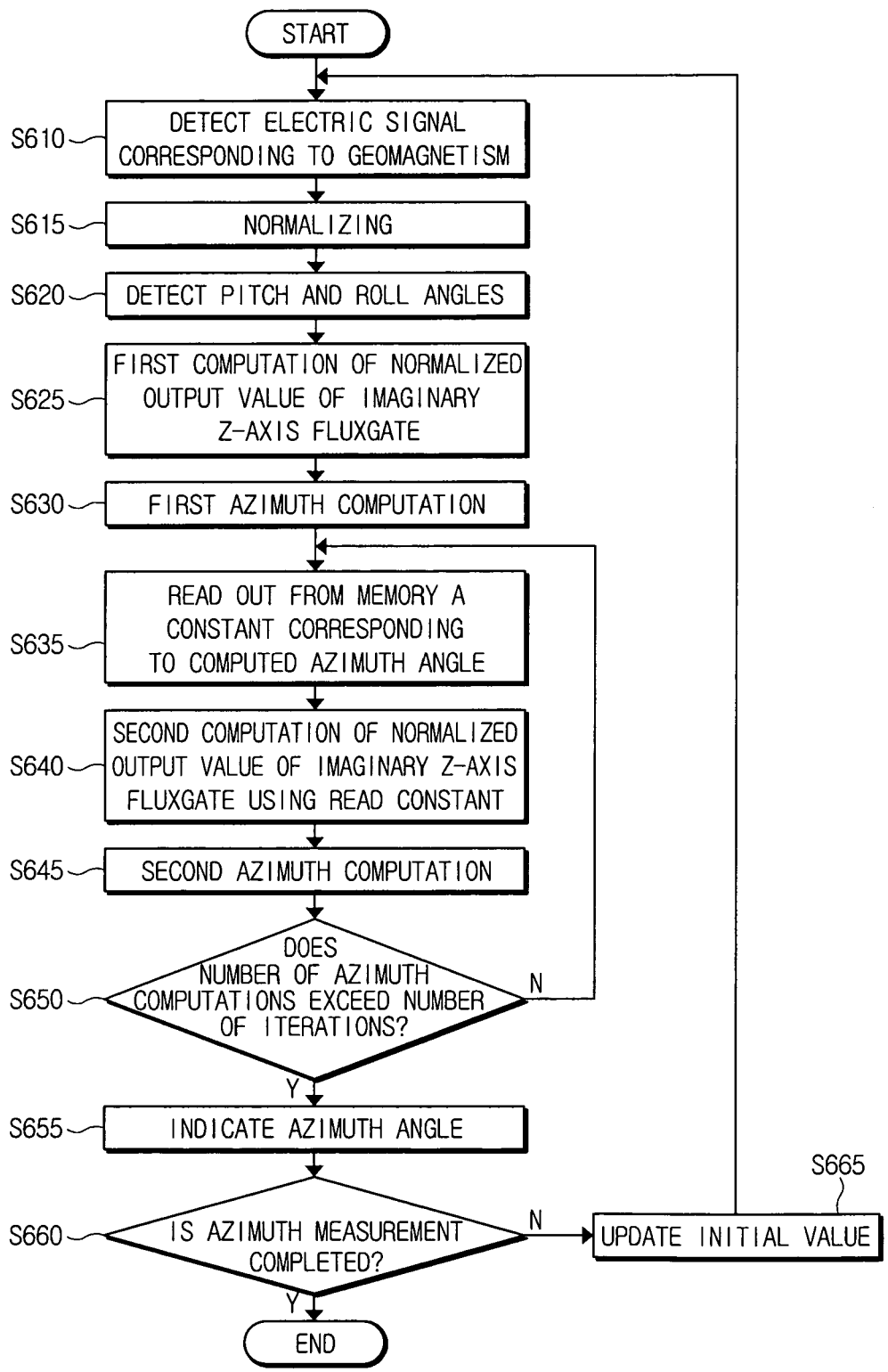

GEOMAGNETIC SENSOR FOR DETECTING AZIMUTH ANGLE AND METHOD THEREOF

CROSS-REFERENCE TO RELATED APPLICATIONS

This application claims benefit under 35 U.S.C. § 119 from Korean Patent Application No. 2004-104770, filed Dec. 13, 2004, in the Korean Intellectual Property Office, the entire content of which is incorporated herein by reference.

BACKGROUND OF THE INVENTION

1. Field of the Invention

The present invention relates to a geomagnetic sensor for azimuth detection and a method thereof. More particularly, the present invention relates to a geomagnetic sensor for accurate azimuth detection, which compensates for the influences of inclination before calculation of magnetic dip, and a method thereof.

2. Description of the Related Art

A geomagnetic sensor operates to measure intensity and direction of a terrestrial magnetism which a human can not perceive, and in particular, a sensor which operates to measure the geomagnetism using a fluxgate is called a fluxgate type geomagnetic sensor.

The fluxgate type geomagnetic sensor includes a fluxgate core made of a material having a high magnetic permeability such as permalloy, or other such material known in the art, a driving coil wounding the core, and a detection coil. Two or three fluxgate cores may be employed. The fluxgate cores are built in perpendicular relation with each other. Accordingly, a two-axis fluxgate sensor is formed of X and Y-axis fluxgates, while a three-axis fluxgate sensor includes X, Y and Z-axis fluxgates. As a driving signal is received at each driving coil wound on the fluxgate cores, magnetism is transduced by the cores. Therefore, by detecting a secondary harmonic component in proportion to an external magnetic field using the detection coil, the magnitude and direction of the external magnetic field can be measured.

The magnetic field has a certain orientation, and therefore, measurement varies depending on the postures of the geomagnetic sensor. In other words, discrepancy may occur between a measured azimuth and an actual azimuth when the geomagnetic sensor is in inclined posture during sensing. In order to eliminate such a problem, the recent suggestion was that a tilt angle is measured using a proper sensor such as an acceleration sensor, so that the measured tilt angle can be used to compensate for the influence by the inclination of the geomagnetic sensor and subsequently provide an accurate azimuth angle. A geomagnetic sensor using a three-axis fluxgate does not necessarily take a dip angle λ into account. However, the dip angle needs be considered especially when the geomagnetic sensor uses a two-axis fluxgate. Because in the case of a two-axis fluxgate sensor, there are only X and Y-axis fluxgates placed on the earth's surface, an azimuth is measured using only the horizontal component value of an actual geomagnetic vector incident on the earth. In other words, the 'dip angle' refers to an angle by which the terrestrial magnetism enters the earth's surface, and therefore, cos λ needs be multiplied by the vector of the actual terrestrial magnetism which is measured by the fluxgates. For this reason, the two-axis fluxgate sensor requires information about dip angle.

Conventionally, a two-axis fluxgate sensor either estimates a dip angle or receives information about dip angle from an external device such as a global positioning system (GPS), or other such system known in the art. However, the estimated dip angle received in this way is often not accurate, and therefore, causes a problem that the azimuth angle information may be distorted. Using the external device such as GPS to receive information about dip angle also requires additional equipment for communication with the external device. Thus, the size and manufacturing cost of the geomagnetic sensor increases. Meanwhile, there has been an attempt to compute the dip angle within the geomagnetic sensor. However, it is difficult to obtain an accurate dip angle by computation, and the geomagnetic sensor is burdened with increased computations to obtain the dip angle.

Even though it does not require dip angle, the three-axis fluxgate sensor also has a problem. That is, because a Z-axis fluxgate is additionally required for the three-axis fluxgate sensor, the size of the sensor inevitably increases, and therefore, the sensor is somewhat inappropriate for use in a portable electronic appliances.

SUMMARY OF THE INVENTION

The present invention has been made to address the above-mentioned problems of the present invention, and therefore, an aspect of the present invention is to provide a geomagnetic sensor and a method thereof, which is capable of measuring accurate azimuth angle without requiring information about dip angle, by iterating computation of azimuth angle several times with varying constants for compensating for the influence of the dip angle.

According to an exemplary embodiment of the present invention, a geometric sensor is provided. The sensor includes a geomagnetic detection module which is configured to output an electric signal value corresponding to a geomagnetism, a tilt detection module which is configured to detect a tilt angle which indicates a degree of inclination with reference to a reference plane, a memory which is configured to store a constant for each azimuth angle for consideration of geomagnetic influence by a dip angle, and a central processing unit which is configured to perform a first azimuth computation using an initial value of the constant, the electric signal value and the tilt angle, and to perform a second azimuth computation by detecting from the memory a constant corresponding to an azimuth of the first azimuth computation and using the detected constant.

The central processing unit may update the initial value of the constant with the detected constant when the second azimuth computation is completed.

The central processing unit may perform the first and second azimuth computations using the updated constant each time the electric signal value and the tilt angle are detected from the geomagnetic detection module and the tilt detection module, respectively.

The central processing unit may perform the azimuth computations a certain number of times.

The geomagnetic detection module comprises an X-axis fluxgate and a Y-axis fluxgate for respectively outputting an electric signal corresponding to geomagnetism as induced by a driving signal.

Additionally, the geomagnetic sensor may further include a normalizing part which is configured to perform a normalizing process to map the electric signal from the X and Y-axis fluxgates into values of a predetermined range, and a display part which is configured to display the resultant value of the second azimuth computation. The central processing unit may perform the first and the second azimuth computations using the normalized electric signal value of the normalizing part.

The tilt detection module may comprise an X-axis acceleration sensor and a Y-axis acceleration sensor which are fabricated in a perpendicular relation with each other, and which output an electric signal corresponding to a deviation with respect to the reference plane, a tilt normalizing part which is configured to perform a normalizing process to map the electric signal from each of the X and Y-axis acceleration sensors to a certain value, and a tilt computation part which is configured to compute pitch and roll angles using the value normalized at the tilt normalizing part and to output the pitch and roll angles as the tilt angle.

The central processing unit may compute an output value of an imaginary Z-axis fluxgate and may perform the first and second azimuth computations using the result of a certain mathematical expression.

According to another exemplary embodiment of the present invention, a method of measuring an azimuth angle of a geomagnetic sensor having a memory storing a constant for each azimuth angle for consideration of geomagnetic influence by a dip angle may be provided. The method may include outputting an electric signal corresponding to a geomagnetism, normalizing the output electric signal by mapping the electric signal to a predetermined range, detecting a tilt angle which indicates a degree of deviation of the geomagnetic sensor with respect to a reference plane, performing a first azimuth computation using an initial value of the constant, the normalized electric signal value and the tilt angle, detecting from the memory a constant corresponding to an azimuth of the first azimuth computation, and performing a second azimuth computation using the detected constant, the normalized electric signal value and the tilt angle.

After completion of the second azimuth computation, the initial value of the constant may be updated with the detected constant.

Whenever detecting the electric signal value and the tilt angle, performing the first and the second azimuth computations using the updated constant may be further provided.

The detecting the constant and the performing the second azimuth computation may be repeated a certain number of times.

The outputting the electric signal may include supplying a driving signal to an X-axis fluxgate and a Y-axis fluxgate which are fabricated in a perpendicular relation with each other, and detecting an electric signal value corresponding to a geomagnetism induced at each of the X and Y-axis fluxgates by the driving signal.

The detecting the tilt angle may include detecting from an X-axis acceleration sensor and a Y-axis acceleration sensor, an electric signal corresponding to a degree of deviation with respect to a reference plane, the X and Y-axis acceleration sensors being fabricated in a perpendicular relation with each other, normalizing, by mapping the electric signal detected from each of the X and Y-axis acceleration sensors to a predetermined range, computing the pitch angle and the roll angle by substituting the normalized values in certain mathematical expressions, and outputting the pitch angle and the roll angle as the tilt angle.

The first and second azimuth computations may further include computing an output value of an imaginary Z-axis fluxgate by using certain mathematical expression.

The first and second azimuth computations may also further include computing the azimuth angle by substituting the output value of the Z-axis fluxgate in certain mathematical expression.

BRIEF DESCRIPTION OF THE DRAWINGS

The above and other aspects of the present invention will be more apparent by describing certain exemplary embodiments of the present invention with reference to the accompanying drawings, in which:

FIG. 5 is a conceptual view illustrating an example of a database construction which is stored in the memory of FIG. 2; and FIG. 6 is a flowchart provided for explanation of an azimuth angle measuring method according to an exemplary embodiment of the present invention.

DETAILED DESCRIPTION OF EXEMPLARY EMBODIMENTS OF THE PRESENT INVENTION

Exemplary embodiments of the present invention will be described herein below with reference to the accompanying drawings.

Figure 1:
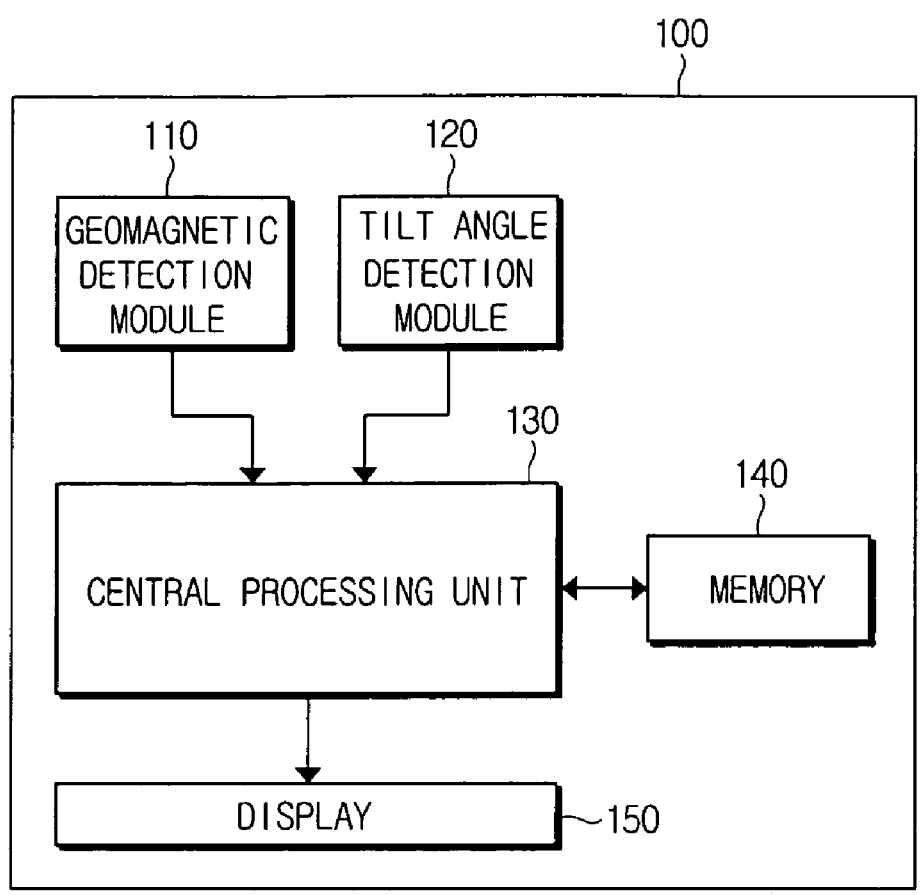
FIG. 1 is a block diagram of a geomagnetic sensor according to an exemplary embodiment of the present invention.

FIG. 1 is a block diagram showing the construction of a geomagnetic sensor according to an exemplary embodiment of the present invention. Referring to FIG. 1, the geomagnetic sensor 100 includes a geomagnetic detection module 110, a tilt detection module 120, a central processing unit 130, a memory 140 and a display 150.

The geomagnetic detection module 110 operates to transduce an external magnetic field into an electric signal and to output the electric signal. The electric signal may be adjusted to a predetermined output range of values.

The tilt detection module 120 operates to detect a tilt angle which indicates how much the geomagnetic sensor 100 is inclined. The tilt angle may be pitch and roll angles, and will be described in detail below.

The memory 140 stores a database which lists constants set according to the respective azimuth angles. The database may be made and stored by a manufacturer, or by a user. For example, a manufacturer, who has a jig to accurately set the horizontal orientation of the sensor, and a shield to block any influence of ambient magnetic field, may rotate the geomagnetic sensor 100 and compute constants for each of the azimuth angles in the laboratory, and store the database in the memory 140.

The central processing unit 130 computes an azimuth angle, using the electric signals detected from the geomagnetic detection module 110 and the tilt angle detected from the tilt detection module 120. In an initial process of computing an azimuth angle, the initial constant value stored in the database can be used in the computation of the azimuth angle. Once the azimuth angle is computed, a constant value corresponding to the resultant value is read from the database of the memory 140. Accordingly, the central processing unit 130 secondly computes an azimuth angle, by using the constant value as read, the electric signal used in the first computation, and the tilt angle. In other words, the variables used in the first azimuth computation are fixed, while only the constant values are computed the second time. The central processing unit 130 accordingly controls the display 150 to display the secondly computed azimuth angle.

As the geomagnetic detection module 110 and the tilt detection module 120 output electric signals and tilt angle, the central processing unit 130 updates the initial constant value with the constant value from the second computation, and uses the same. In other words, an azimuth angle is first computed by using the constants used in the second azimuth computation, a newly-detected electric signal and the tilt angle, and then the second azimuth computation is performed by retrieving a constant corresponding to the firstly-computed azimuth from the database.

The central processing unit 130 performs the second azimuth computation whenever detecting the electric signal value and tilt angle, and may iterate the second azimuth computation as many times as set by the manufacturer or the user. For example, the central processing unit 130 may iterate the second azimuth computation three or four times, to thus indicate more accurate azimuth angle.

Figure 2:
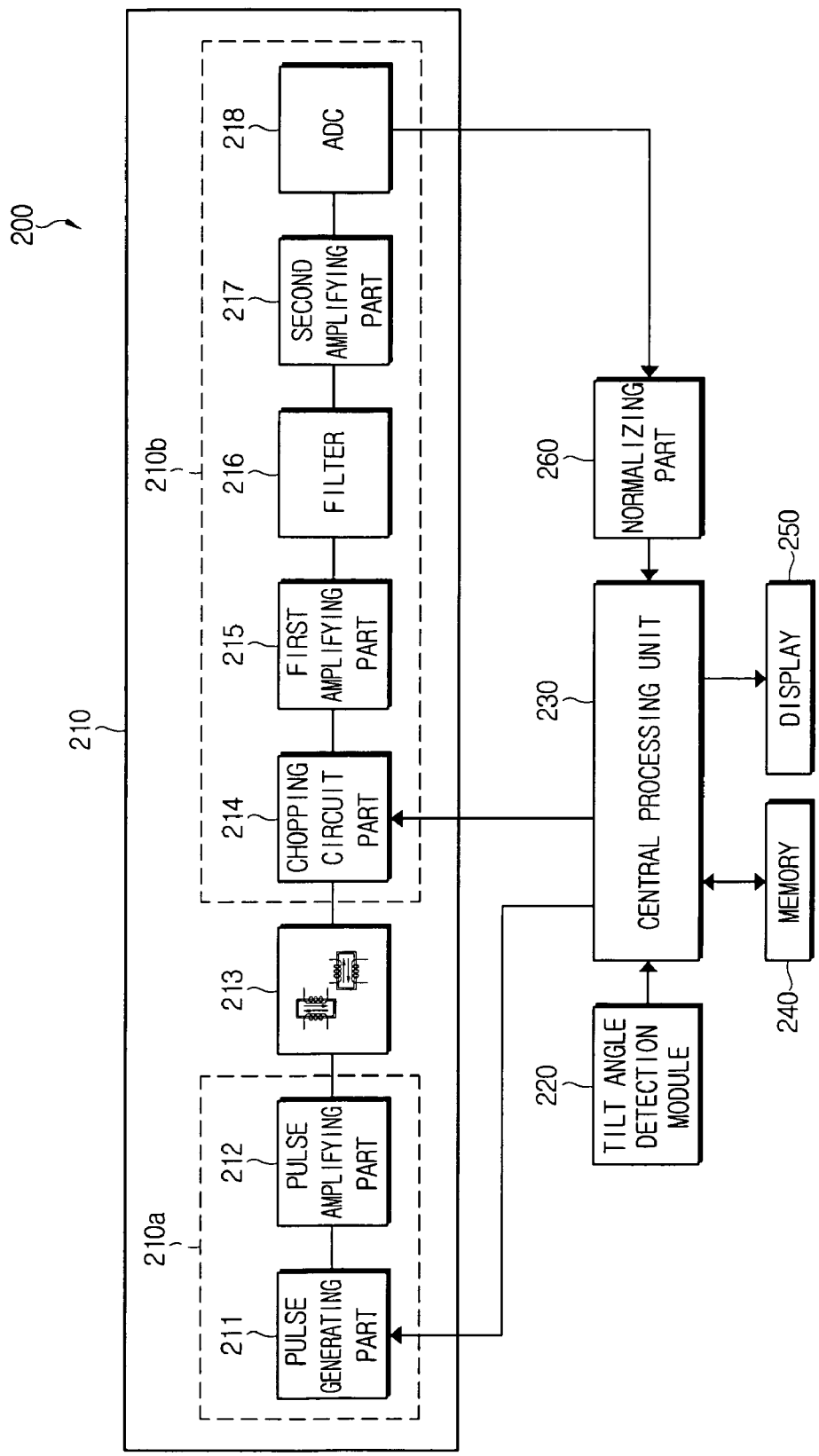
FIG. 2 is a block diagram of a geomagnetic sensor according to another exemplary embodiment of the present invention.

FIG. 2 is a block diagram illustrating the structure of a geomagnetic sensor according to another exemplary embodiment of the present invention. Referring to FIG. 2, the geomagnetic sensor 200 includes a geomagnetic detection module 210, a tilt detection module 220, a central processing unit 230, a memory 240, a display 250 and a normalizing part 260.

As mentioned above, the geomagnetic detection module 210 operates to output an electric signal corresponding to the geomagnetism. Referring to FIG. 2, the geomagnetic detection module 210 includes a driving signal generating part 210*a*, a two-axis fluxgate 213, and a signal processing part 210*b*. The driving signal generating part 210*a* operates to supply driving signals to the driving coils wound on the X and Y fluxgates 213, respectively. To this end, the driving signal generating part 210*a* includes a pulse generating part 211 which generates pulse signal, and a pulse amplifying part 212 which amplifies the generated pulse signal and then inverse-amplifies so as to output pulse waves and inverse pulse waves.

The two-axis fluxgate 213 includes X and Y-axis fluxgates which are in perpendicular relation with each other, and each fluxgate outputs an electromotive force which is transduced from the magnetism of the driving signal. The electromotive force may be adjusted to a predetermined output range of values.

The signal processing part 210*b* processes, to therefore convert and output such induced electromotive force of the two-axis fluxgate 213 as digital values. The digital values may be adjusted to fit within a certain range of output values. The signal processing part 210*b* includes a chopping circuit part 214 which chops the induced electromotive force by using several switches, a first amplifying part 215 which differentially amplifies the chopped electric signal, a filter 216 which filters the amplified electric signal to a range, a second amplifying part 217 which secondly amplifies the filtered signal, and an A/D converter 218 which converts the secondly-amplified signal into a digital value.

Depending on the magnitude of the geomagnetism, the electric signal, which is converted and output by the signal processing part 210*b* as values, may exceed the range that can be processed by the central processing unit 230. In order to prevent this, a normalizing process is performed to map the electric signal values from the geomagnetic detection module 210 to a predetermined range.

The normalizing part 260 performs the normalizing job. The normalizing part 260 may perform the normalizing process using the following equation:

$$Xf_{norm} = \frac{(Xf - Xf_{bias})}{Xf_{sf}} * \alpha \quad \text{[Equation 1]}$$

$$Yf_{norm} = \frac{(Yf - Yf_{bias})}{Yf_{sf}} * \alpha$$

$$Xf_{bias} = \frac{Xf_{max} + Xf_{min}}{2}, \; Xf_{sf} = \frac{Xf_{max} - Xf_{min}}{2}$$

$$Yf_{bias} = \frac{Yf_{max} + Yf_{min}}{2}, \; Yf_{sf} \frac{Yf_{max} - Yf_{min}}{2}$$

where, Xf and Yf refer to output values from the X and Y-axis fluxgates, $Xf_{norm}$ and $Yf_{norm}$ refer to the output values from the X and Y-axis fluxgates after the normalizing process, $Xf_{max}$ and $Xf_{min}$ refer to maximum and minimum values of Xf, respectively, $Yf_{max}$ and $Yf_{min}$ refer to maximum and minimum values of Yf, respectively, and a refers to a fixed constant. Alpha ($\alpha$) is set to be smaller than '1' so that the output values of the X and Y-axis fluxgates can be mapped within the range of ±1. It is advantageous if $\alpha$ may be set by using a representative dip angle of a local area where the geomagnetic sensor 200 is currently used. For example, in South Korea where the dip angle is approximately 53°, $\alpha$ may be set to cos 53°≈0.6. $Xf_{max}$ and $Xf_{min}$ and $Yf_{max}$, and $Yf_{min}$ may be obtained by measuring the output values of the geomagnetic sensor 200, while rotating the geomagnetic sensor 200 several times, and selecting the maximum and minimum of the measured values.

The tilt detection module 220 computes pitch angle and roll angle by measuring the gravity acceleration speed of the geomagnetic sensor 200, and outputs the tilt angle. To this end, the tilt detection module 220 has a two-axis acceleration sensor which is formed in the same axis direction as the two-axis fluxgate sensor 213.

Figure 3:
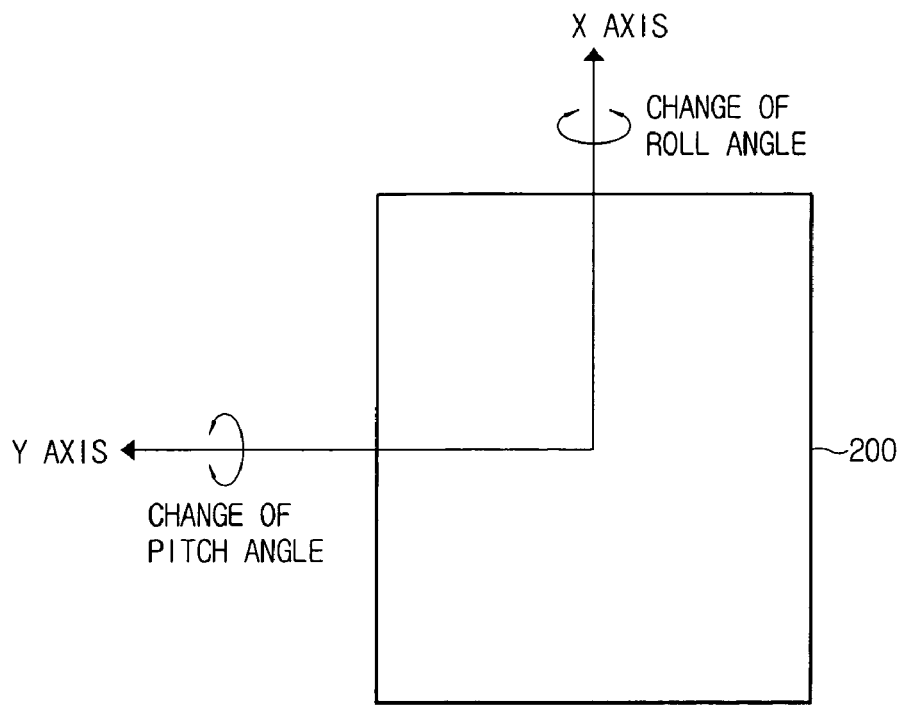
FIG. 3 is a conceptual view illustrating reference axes for the measurement of pitch and roll angles.

FIG. 3 shows X and Y axes, which are the reference for the measurement of the pitch and roll angles.

Referring to FIG. 3, the X-axis fluxgate and the X-axis acceleration sensor are installed in the X-axis direction, while the Y-axis fluxgate and the Y-axis acceleration sensor are installed in the Y-axis direction. When the geomagnetic sensor 200 is rotated with reference to the Y-axis which is the reference directional axis of the Y-axis fluxgate and the Y-axis acceleration sensor, the angle between the reference plane and X-Y plane after rotation becomes the pitch angle. When the geomagnetic sensor 200 is rotated with reference to the X-axis which is the reference directional axis of the X-axis fluxgate and the X-axis acceleration sensor, the angle between the reference plane and X-Y plane after rotation becomes the roll angle. The term 'reference plane' refers to a plane formed by the X and Y axes before the rotation, and it is in parallel relation with the ground surface.

Figure 4:
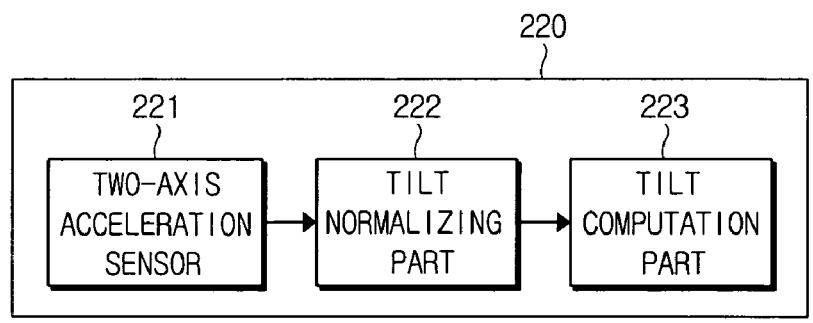
FIG. 4 is a block diagram of an example of a tilt detection module used in the geomagnetic sensor of FIG. 2.

FIG. 4 shows one example of a tilt detection module to measure pitch and roll angles. Referring to FIG. 4, the tilt detection module includes a two-axis acceleration sensor 221, a tilt normalizing part 222 and a tilt computation part 223.

The two-axis acceleration sensor 221 includes X and Y-axis acceleration sensors which are in perpendicular relation with each other. According to the sloping degree of the geomagnetic sensor 200, the X and Y-axis acceleration sensors output varying electric signals.

The tilt normalizing part 222 performs a normalizing process so as to map the electric signals from the two-axis acceleration sensor 221 to a predetermined value. The normalizing process may be preformed, using the following equations:

$$Xt_{norm} = \frac{(Xt - Xt_{bias})}{Xt_{sf}} \quad [\text{Equation 2}]$$

$$Yt_{norm} = \frac{(Yt - Yt_{bias})}{Yt_{sf}}$$

$$Xt_{bias} = \frac{Xt_{max} + Xt_{min}}{2}, \; Xt_{sf} = \frac{Xt_{max} - Xt_{min}}{2}$$

$$Yt_{bias} = \frac{Yt_{max} + Yt_{min}}{2}, \; Yt_{sf} = \frac{Yt_{max} - Yt_{min}}{2}$$

where, Xt and Yt refer to output values of the X and Y-axis acceleration sensors, $Xt_{norm}$ and $Yt_{norm}$ refer to output values of the X and Y-axis acceleration sensors after the normalizing process, $Xt_{max}$ and $Xt_{min}$ refer to maximum and minimum values of Xt, respectively, and $Yt_{max}$ and $Yt_{min}$ refer to maximum and minimum values of Yt, respectively. Like the geomagnetic detection module 210, $Xt_{max}$ and $Xt_{min}$, and $Yt_{max}$ and $Yt_{min}$ may be obtained through measurements and stored in advance.

The tilt computation part 223 operates to compute pitch and roll angles, using the output values of the two-axis acceleration sensor 212 which are normalized by the tilt normalizing part 222. The following equations may be used in the computation:

$$\theta = \sin^{-1}(Xt_{norm}) \quad [\text{Equation 3}]$$

$$\phi = \sin^{-1}\left(\frac{Yt_{norm}}{\cos\theta}\right)$$

where, $\theta$ refers to pitch angle, $\phi$ refers to roll angle, and as mentioned above, $Xt_{norm}$ and $Yt_{norm}$ refer to output values of the X and Y-axis acceleration sensors after the normalizing process.

Referring now back to FIG. 2, the central processing unit 230 first computes azimuth angle when output values are detected at the geomagnetic detection module 210 and the tilt detection module 220, respectively. The output values of the geomagnetic detection module 210 may be used by normalizing with the normalizing part 260.

Because an azimuth angle is a three-dimensional space value which can be represented by three axes, a Z-axis output value which is perpendicular to the plane made by the X and Y axes, is also necessary for the azimuth computation. Accordingly, the central processing unit 230 is first required to compute the normalized output value of the Z-axis fluxgate, before performing the first azimuth computation. The following equations may be used.

$$Zf_{norm} = \frac{(\beta - Xf_{norm} * \sin\theta - Yf_{norm} * \cos\theta * \sin\phi)}{\cos\theta} \quad [\text{Equation 4}]$$

$$Zf_{norm} = \beta - Xf_{norm} * \sin\theta - Yf_{norm} * \cos\theta * \sin\phi \quad [\text{Equation 5}]$$

$$Zf_{norm} = \beta - Xf_{norm} * \sin\theta \quad [\text{Equation 6}]$$

where, $Zf_{norm}$ refers to normalized output value (hereinbelow, Z-axis output value) of an imaginary Z-axis fluxgate, $\beta$ refers to a constant value, $\theta$ refers to pitch angle, $\phi$ refers to roll angle, and $Xf_{norm}$ and $Yf_{norm}$ refer to the normalized output values of the X and Y-axis fluxgates, respectively. For simplicity, the Equations 4 and 5 set the roll angle to '0°'. Considering the fact that users of the portable devices such as mobile phones or personal digital assistants (PDAs) usually place the display screen on a horizontal relation with the ground surface, the roll angle can be regarded as '0°'. Meanwhile, because Equations 4 to 6 are used to compute Z-axis output, the central processing unit 230 may use one of these Equations depending on the exemplary embodiment being adopted. It is advantageous to use Equation 6 to compute Z-axis output and thus to minimize the computational requirements.

Beta ($\beta$) of the Equations 4 and 5 denotes a constant value which is adopted to compensate for the influence of dip angle. In the conventional cases, $\sin \lambda$ was computed and reflected in the computation of the Z-axis output in order to take the influence of the dip angle into account. This method, however, was not so efficient to measure the dip angle accurately. Because the influence by the dip angle in the horizontal position appears as a fixed constant, and this value varies in constant degrees even in the case of tilting, an adequate constant can be estimated by experimentation. Accordingly, by varying the inclination of the geomagnetic sensor 200 in a regular manner, a manufacturer of the geomagnetic sensor 200 can measure and make a database with detected azimuth angles and the values $\beta$. Such a database may then be stored in the memory 240.

Figure 5:
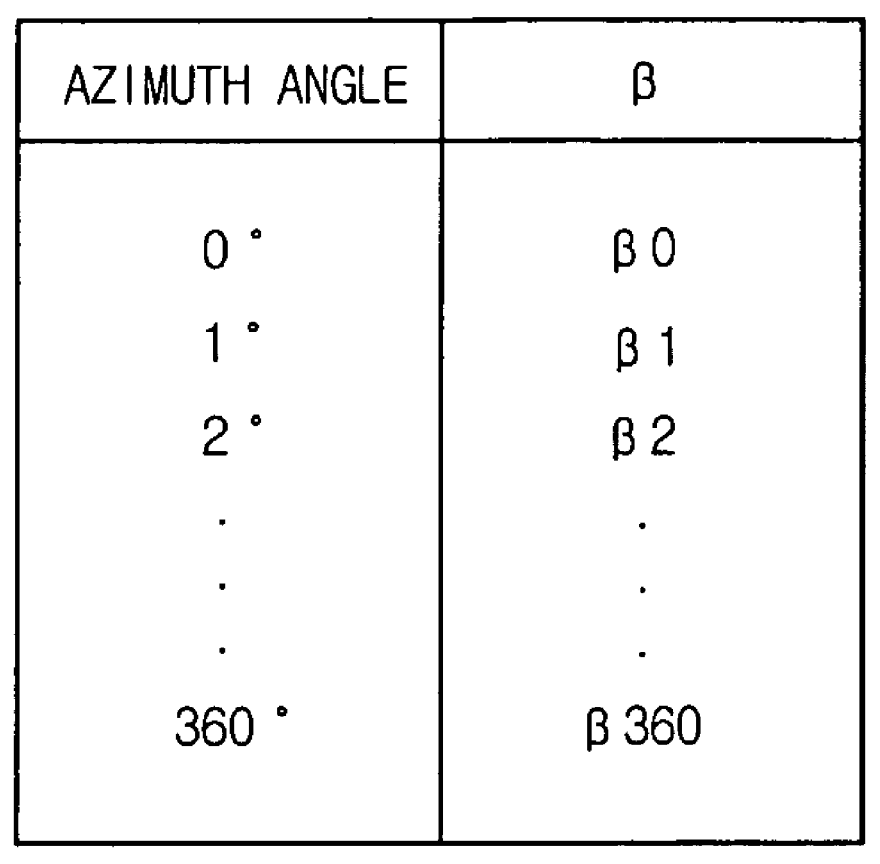

FIG. 5 shows one example of the database stored in the memory 240. Referring to FIG. 5, values $\beta$ are set to correspond to the azimuth angles from 0° to 360°. In order to utilize the capacity of the memory 240 as efficiently as possible, the azimuth angles can be divided into 5° or 10° increments.

In an initial computation of the Z-axis output, the central processing unit 230 uses the initial $\beta$ which is determined in advance. The initial $\beta$ may be set by using $\sin \lambda$. In South Korea for example, the Z-axis output can be initially computed by using $\sin \beta = 53° \approx 0.8$.

As the Z-axis output is computed, the central processing unit 230 substitutes the normalized X and Y-axis outputs, the pitch angle, and the roll angle in the following Equation, to thus perform a first computation of the azimuth angle.

$$\psi = \tan^{-1}\left(\frac{(Zf_{norm} * \sin\phi - Yf_{norm} * \cos\phi)}{(Xf_{norm} * \cos\theta + Yf_{norm} * \sin\theta * \sin\phi + Zf_{norm} * \sin\theta\cos\phi)}\right) \quad [\text{Equation 7}]$$

where, $\psi$ refers to azimuth angle. The central processing unit 230 looks up the result of the first computation in a database, such as the one shown in FIG. 5, and therefore reads out a corresponding value $\beta$.

The central processing unit 230 substitutes the new value $\beta$ in one of the Equations 4 to 6, and thus re-computes the Z-axis output. The other variables except the value $\beta$, are fixed, and are the same as the values used for the first computation. Accordingly, the central processing unit 230 re-computes azimuth angle by substituting the re-computed Z-axis output in the Equation 7. Likewise, the other variables, except for the Z-axis output, are fixed as used in the first computation.

The central processing unit 230 iterates computations of Z-axis output and azimuth angle a certain number of times. Accordingly, if the number of iterations is set to two times, the central processing unit 230 indicates twice-computed azimuth angle, and if the number of iterations is set to three times, the central processing unit 230 reads out value β corresponding to the twice-computed azimuth angle from the database and thirdly computes the Z-axis output, thirdly computes azimuth angle, and indicates the result.

The central processing unit 230 controls the display 250 so that the finalized computation result is displayed on the display screen. The display 250 indicates azimuth angle through a liquid crystal display (LCD) panel, a light emitting diode (LED), or other such display device known in the art.

Meanwhile, when the next output values are detected at the geomagnetic detection module 210 and the tilt detection module 220, the central processing unit 230 updates the initial β to β which was previously used. Accordingly, the value β which was used in the previous azimuth detection process is substituted in the first computation of the Z-axis output. Because a more optimum β value can be used as the azimuth computation repeats, more accurate azimuth angle can be measured.

FIG. 6 is a flowchart provided for explaining the method of measuring azimuth angle according to an exemplary embodiment of the present invention. Referring to FIG. 6, first, an electric signal value corresponding to the geomagnetism is detected at the geomagnetic detection module 210 (S610).

Accordingly, the normalizing part 260 performs a normalizing process and thus maps into values of a predetermined range (S615). The normalizing process can be performed by using the Equation 1.

Next, the tilt detection module 220 detects pitch and roll angles (S620). In order to detect the pitch and roll angles, the tilt detection module 220 normalizes the outputs from the X and Y-axis acceleration sensors using the Equation 2, and then computes pitch and roll angles using the Equation 3.

Next, the first computation of the normalized output from the imaginary Z-axis fluxgate is performed using the outputs from the normalized X and Y-axis fluxgates, the pitch angle and the roll angle (S625). One of the Equations 4 to 6 may be used in the computation, but it is advantageous if Equation 6 is used in order to reduce computational requirements as much as possible. Meanwhile, an initial value is used as for the value β in the Z-axis output computation. The initial value can be obtained from the sin-function of the dip angle of the local area, and for example, approximately 0.8 can be used as the initial value β in South Korea.

Next, the first azimuth computation is performed using the computed Z-axis output (S630). The Equation 7 can be used for the azimuth angle computation.

The central processing unit 230 substitutes the resultant azimuth angle of the first computation in the stored database and thus reads out corresponding value β (S635). To this end, a manufacturer of the geomagnetic sensor 200 builds a database of optimum values β for each of the azimuth angles and stores the database in the memory 240.

The central processing unit 230 secondly computes the Z-axis output by using the read value β (S640). In this case, other variables except for the value β are fixed.

Next, the second azimuth computation is performed using the secondly-computed Z-axis output (S645). Likewise, the other variables except for the Z-axis output, are fixed.

Accordingly, it is checked whether the number of iterations of the azimuth computations have been met, as determined by the manufacturer or the user (S650), and if so, the final result of the computations is indicated on the display screen (S655). For example, if the number of computation iterations is set to three times, the value β corresponding to the secondly-computed azimuth angle is read out from the memory 240 (S635), and the Z-axis output and the azimuth angle are computed a third time (S640, S645).

Meanwhile, if the azimuth measurement continues (S660), the central processing unit 230 updates the initial value β to the last-used value β (S665). Accordingly, in the first computation of the Z-axis output using the next outputs from the geomagnetic detection module 210 and the tilt detection module 220, the updated value β is used as the initial value. As the azimuth measurement repeats, a more accurate value of the constant β can be used, and therefore, a more accurate azimuth can be obtained.

As described above in exemplary embodiments of the present invention, without having to separately measure or receive the dip angle, an accurate azimuth angle can be computed in consideration of the influence by the dip angle. Therefore, a similar effect as using the three-axis fluxgate can be obtained from the two-axis fluxgate sensor, and a high quality and ultra compact geomagnetic sensor can be provided.

The foregoing embodiments are merely exemplary and are not to be construed as limiting the present invention. The present teaching can be readily applied to other types of apparatuses. Also, the description of the exemplary embodiments of the present invention is intended to be illustrative, and not to limit the scope of the claims, and many alternatives, modifications, and variations will be apparent to those skilled in the art.

What is claimed is:

1. A geomagnetic sensor, comprising:
   a geomagnetic detection module which is configured to output an electric signal value corresponding to a geomagnetism;
   a tilt detection module which is configured to detect a tilt angle which indicates a degree of inclination with reference to a reference plane;
   a memory which is configured to store a constant for each azimuth angle for consideration of geomagnetic influence by a dip angle; and
   a central processing unit which is configured to perform a first azimuth computation using an initial value of the constant, the electric signal value and the tilt angle, and to perform a second azimuth computation by detecting from the memory a constant corresponding to an azimuth of the first azimuth computation and using the detected constant.

2. The geomagnetic sensor of claim 1, wherein the central processing unit updates the initial value of the constant with the detected constant when the second azimuth computation is completed.

3. The geomagnetic sensor of claim 2, wherein the central processing unit performs the first and second azimuth computations using the updated constant each time the electric signal value and the tilt angle are detected from the geomagnetic detection module and the tilt detection module, respectively.

4. The geomagnetic sensor of claim 3, wherein the central processing unit performs the azimuth computations a certain number of times.

5. The geomagnetic sensor of claim 1, wherein the geomagnetic detection module comprises an X-axis fluxgate and a Y-axis fluxgate for respectively outputting the electric signal corresponding to the geomagnetism as induced by a driving signal.

6. The geomagnetic sensor of claim 5, further comprising a normalizing part which is configured to perform a normalizing process to map the electric signal from the X and Y-axis fluxgates to values of a predetermined range; and a display part which is configured to indicate the resultant value of the second azimuth computation, wherein the central processing unit performs the first and the second azimuth computations using the normalized electric signal value from the normalizing part.

7. The geomagnetic sensor of claim 6, wherein the normalizing part performs the normalizing process using the following equations:

$$Xf_{norm} = \frac{(Xf - Xf_{bias})}{Xf_{sf}} * \alpha$$

$$Yf_{norm} = \frac{(Yf - Yf_{bias})}{Yf_{sf}} * \alpha$$

$$Xf_{bias} = \frac{Xf_{max} + Xf_{min}}{2}, Xf_{sf} = \frac{Xf_{max} - Xf_{min}}{2}$$

$$Yf_{bias} = \frac{Yf_{max} + Yf_{min}}{2}, Yf_{sf} \frac{Yf_{max} - Yf_{min}}{2}$$

where, Xf and Yf are output values from the X and Y-axis fluxgates, $Xf_{norm}$ and $Yf_{norm}$ are output values from the X and Y-axis fluxgates after the normalizing process, $Xf_{max}$ and $Xf_{min}$ are maximum and minimum values of Xf, respectively, $Yf_{max}$ and $Yf_{min}$ are maximum and minimum values of Yf, respectively, and $\alpha$ is a fixed constant.

8. The geomagnetic sensor of claim 1, wherein the tilt detection module comprises:

an X-axis acceleration sensor and a Y-axis acceleration sensor which are disposed in a perpendicular relation with each other, and which output an electric signal corresponding to a deviation with respect to the reference plane;

a tilt normalizing part which is configured to perform a normalizing process to map the electric signal from each of the X and Y-axis acceleration sensors to a certain value; and a tilt computation part which is configured to compute pitch and roll angles using the value normalized in the tilt normalizing part and to output the pitch and roll angles as the tilt angle.

9. The geomagnetic sensor of claim 8, wherein the tilt computation part computes the pitch and roll angles using the following equations:

$$\theta = \sin^{-1}(Xt_{norm})$$

$$\phi = \sin^{-1}\left(\frac{Yt_{norm}}{\cos\theta}\right)$$

where, $\theta$ is the pitch angle, $\phi$ is the roll angle, and $Xt_{norm}$ and $Yt_{norm}$ are output values of the X and Y-axis acceleration sensors, respectively, after the normalizing process.

10. The geomagnetic sensor of claim 1, wherein the central processing unit computes an output value of an imaginary Z-axis fluxgate using one of the following equations and performs first and second azimuth computations using the output value:

$$Zf_{norm} = \frac{(\beta - Xf_{norm} * \sin\theta - Yf_{norm} * \cos\theta * \sin\phi)}{\cos\theta}$$

$$Zf_{norm} = \beta - Xf_{norm} * \sin\theta - Yf_{norm} * \cos\theta * \sin\phi$$

$$Zf_{norm} = \beta - Xf_{norm} * \sin\theta$$

where, $Zf_{norm}$ is a normalized output value of the imaginary Z-axis fluxgate, $\beta$ is a constant value, $\theta$ is a pitch angle, $\phi$ is a roll angle, and $Xf_{norm}$ and $Yf_{norm}$ are the normalized output values of the X and Y-axis fluxgates, respectively.

11. The geomagnetic sensor of claim 10, wherein the central processing unit performs the first and the second azimuth computations by substituting the output values from the Z-axis fluxgate into the equation:

$$\psi = \tan^{-1}\left(\frac{(Zf_{norm} * \sin\phi - Yf_{norm} * \cos\phi)}{(Xf_{norm} * \cos\theta + Yf_{norm} * \sin\theta * \sin\phi + Zf_{norm} * \sin\theta\cos\phi)}\right)$$

where, $\psi$ is an azimuth angle, $Xf_{norm}$ and $Yf_{norm}$ are the normalized output values of the X and Y-axis fluxgates, respectively, $Zf_{norm}$ is the normalized output value of the imaginary Z-axis fluxgate, $\theta$ is pitch angle, and $\phi$ is roll angle.

12. A method of measuring an azimuth angle of a geomagnetic sensor having a memory storing a constant for each azimuth angle for consideration of a geomagnetic influence by a dip angle, the method comprising:

outputting an electric signal corresponding to a geomagnetism;

normalizing the output electric signal by mapping the electric signal to a predetermined range;

detecting a tilt angle which indicates a degree of deviation of a geomagnetic sensor with respect to a reference plane;

performing a first azimuth computation using an initial value of the constant, the normalized electric signal value and the tilt angle;

detecting from the memory a constant corresponding to an azimuth of the first azimuth computation; and performing a second azimuth computation using the detected constant, the normalized electric signal value and the tilt angle.

13. The method of claim 12, further comprising, after completion of the second azimuth computation, updating the initial value of the constant with the detected constant.

14. The method of claim 13, further comprising, performing the first and the second azimuth computations using the updated constant, each time the electric signal value and the tilt angle are detected.

15. The method of claim 14, wherein the detecting the constant and the performing the second azimuth computation are repeated a certain number of times.

16. The method of claim 12, wherein outputting the electric signal further comprises:

supplying a driving signal to an X-axis fluxgate and a Y-axis fluxgate which are fabricated in a perpendicular relation with each other; and detecting an electric signal value corresponding to a geomagnetism induced at each of the X and Y-axis fluxgates by the driving signal.

17. The method of claim 16, wherein the normalizing process is performed using the following equations:

$$Xf_{norm} = \frac{(Xf - Xf_{bias})}{Xf_{sf}} * \alpha$$

$$Yf_{norm} = \frac{(Yf - Yf_{bias})}{Yf_{sf}} * \alpha$$

$$Xf_{bias} = \frac{Xf_{max} + Xf_{min}}{2}, \quad Xf_{sf} = \frac{Xf_{max} - Xf_{min}}{2}$$

$$Yf_{bias} = \frac{Yf_{max} + Yf_{min}}{2}, \quad Yf_{sf} \frac{Yf_{max} - Yf_{min}}{2}$$

where, Xf and Yf are output values from the X and Y-axis fluxgates, respectively, $Xf_{norm}$ and $Yf_{norm}$ are output values from the X and Y-axis fluxgates, respectively, after the normalizing process, $Xf_{max}$ and $Xf_{min}$ are maximum and minimum values of Xf respectively, $Yf_{max}$ and $Yf_{min}$ are maximum and minimum values of Yf, respectively, and $\alpha$ is a fixed constant.

18. The method of claim 12, wherein detecting the tilt angle comprises:

detecting from an X-axis acceleration sensor and a Y-axis acceleration sensor, an electric signal corresponding to a degree of deviation with respect to a reference plane, the X and Y-axis acceleration sensors being fabricated in a perpendicular relation with each other;

normalizing, by mapping the electric signal detected from each of the X and Y-axis acceleration sensors to a predetermined range;

computing a pitch angle and a roll angle by substituting the normalized values in the following equations $$\theta = \sin^{-1}(Xt_{norm})$$

$$\phi = \sin^{-1}\left(\frac{Yt_{norm}}{\cos\theta}\right)$$

where, $\theta$ is the pitch angle, $\phi$ is the roll angle, and $Xt_{norm}$ and $Yt_{norm}$ are output values of the X and Y-axis acceleration sensors after the normalizing process; and outputting the computed pitch angle and roll angle as the tilt angle.

19. The method of claim 12, wherein the first and second azimuth computations further comprise computing an output value of an imaginary Z-axis fluxgate by using one of the following equations:

$$Zf_{norm} = \frac{(\beta - Xf_{norm} * \sin\theta - Yf_{norm} * \cos\theta * \sin\phi)}{\cos\theta}$$

$$Zf_{norm} = \beta - Xf_{norm} * \sin\theta - Yf_{norm} * \cos\theta * \sin\phi$$

$$Zf_{norm} = \beta - Xf_{norm} * \sin\theta$$

where, $Zf_{norm}$ is a normalized output value of the imaginary Z-axis fluxgate, $\beta$ is a constant value, $\theta$ is a pitch angle, $\phi$ is a roll angle, and $Xf_{norm}$ and $Yf_{norm}$ are the normalized output values of the X and Y-axis fluxgates, respectively.

20. The method of claim 19, wherein the first and second azimuth computations further comprise computing the azimuth angle by substituting the output value of the Z-axis fluxgate in the following equation:

$$\psi = \tan^{-1}\left(\frac{(Zf_{norm} * \sin\phi - Yf_{norm} * \cos\phi)}{(Xf_{norm} * \cos\theta + Yf_{norm} * \sin\theta * \sin\phi + Zf_{norm} * \sin\theta\cos\phi)}\right)$$

where, $\psi$ is the azimuth angle, $Xf_{norm}$ and $Yf_{norm}$ are the normalized output values of the X and Y-axis fluxgates, respectively, $Zf_{norm}$ is the normalized output value of the imaginary Z-axis fluxgate, $\theta$ is the pitch angle, and $\phi$ is the roll angle.

* * * * *